United States Patent
Manabe et al.

(10) Patent No.: US 10,717,221 B2
(45) Date of Patent: Jul. 21, 2020

(54) PELLETIZER APPARATUS

(71) Applicant: Kobe Steel, Ltd., Hyogo (JP)

(72) Inventors: Chitaka Manabe, Kobe (JP); Kaname Araki, Kobe (JP); Eiji Takahashi, Kobe (JP); Shin Iwasaki, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 484 days.

(21) Appl. No.: 15/527,674

(22) PCT Filed: Oct. 5, 2015

(86) PCT No.: PCT/JP2015/078156
§ 371 (c)(1),
(2) Date: May 17, 2017

(87) PCT Pub. No.: WO2016/098422
PCT Pub. Date: Jun. 23, 2016

(65) Prior Publication Data
US 2017/0334117 A1 Nov. 23, 2017

(30) Foreign Application Priority Data

Dec. 19, 2014 (JP) ................................. 2014-257096

(51) Int. Cl.
*B29B 9/06* (2006.01)
*B29C 48/00* (2019.01)
(Continued)

(52) U.S. Cl.
CPC ............ *B29C 48/0022* (2019.02); *B26D 1/36* (2013.01); *B26D 3/16* (2013.01); *B26D 5/007* (2013.01);
(Continued)

(58) Field of Classification Search
CPC .......... B29B 9/06; B29B 9/065; B29C 48/04; B29C 48/92; B29C 48/0022;
(Continued)

(56) References Cited

U.S. PATENT DOCUMENTS 5,330,340 A * 7/1994 Suppon ................ B26D 7/2628
425/142
2006/0121142 A1 * 6/2006 Pinchot .................... B26D 1/28
425/208

(Continued)

FOREIGN PATENT DOCUMENTS

EP 0972622 A1 1/2000
JP S51-041758 A 4/1976
(Continued)

OTHER PUBLICATIONS

Notification Concerning Transmittal of the International Preliminary Report on Patentability (Chapter I) and Translation of Written Opinion of the International Searching Authority; PCT/JP2015/078156; dated Jun. 29, 2017.

(Continued)

*Primary Examiner* — Seyed Masoud Malekzadeh
(74) *Attorney, Agent, or Firm* — Studebaker & Brackett PC

(57) ABSTRACT

This pelletizer apparatus includes an observation unit for observing, from the outside of a housing chamber, a cut section of a synthetic resin cut by cutting teeth inside the housing chamber. The observation unit includes an optical system which sends an optical image of the cut section from (Continued)

the inside of the housing chamber to the outside of the housing chamber. Thus, with this pelletizer apparatus, the cut section can be visually checked clearly via the optical system.

3 Claims, 12 Drawing Sheets

(51) Int. Cl.
*B29C 48/04* (2019.01)
*B29C 48/92* (2019.01)
*B26D 1/36* (2006.01)
*B26D 3/16* (2006.01)
*B26D 5/00* (2006.01)

(52) U.S. Cl.
CPC .............. *B29C 48/04* (2019.02); *B29C 48/92* (2019.02); *B29B 9/065* (2013.01); *B29C 2793/009* (2013.01)

(58) Field of Classification Search
CPC . B29C 2793/009; B29C 47/006; B29C 47/92; B29C 47/0011; B26D 1/36; B26D 3/16; B26D 5/007
See application file for complete search history.

(56) References Cited

U.S. PATENT DOCUMENTS

| | | | |
|---|---|---|---|
| 2007/0172533 A1* | 7/2007 | Pinchot | B21C 35/02 425/142 |
| 2007/0259067 A1* | 11/2007 | Pinchot | B26D 7/2614 425/208 |
| 2010/0143520 A1* | 6/2010 | Pinchot | A23N 17/005 425/142 |
| 2013/0221557 A1 | 8/2013 | Yonesato et al. | |

FOREIGN PATENT DOCUMENTS

| | | |
|---|---|---|
| JP | H02-226003 A | 9/1990 |
| JP | H11-129243 A | 5/1999 |
| JP | 2000-280239 A | 10/2000 |
| JP | 2000-289092 A | 10/2000 |
| JP | 2004-230874 A | 8/2004 |
| JP | 2005-138542 A | 6/2005 |
| JP | 2010-030105 A | 2/2010 |
| WO | 2012/063891 A1 | 5/2012 |

OTHER PUBLICATIONS

International Search Report issued in PCT/JP2015/078156; dated Dec. 15, 2015.

* cited by examiner

PELLETIZER APPARATUS

TECHNICAL FIELD

The present invention relates to a pelletizer apparatus in which inside a housing chamber that houses a synthetic resin extruded from a dice hole, the synthetic resin is sequentially cut by means of cutting teeth to form cut pieces (pellets).

BACKGROUND ART

Pelletizer apparatuses have been conventionally known in which inside a housing chamber that houses a synthetic resin extruded from a dice hole, the synthetic resin is sequentially cut by means of cutting teeth to form cut pieces (pellets). In such a pelletizer apparatus, for example, when a clearance between cutting teeth and a dice is increased, a cut surface of a cut piece after cutting might become elongate or might have a burr in some cases. An elongate cut surface or a burr generated on a cut surface will make it difficult to smoothly melt a cut piece and the like in a subsequent step in which a cut piece after cutting is used. Therefore, adjustment of a clearance between cutting teeth and a dice is crucial. In this case, a window for observing the inside of a housing chamber may be formed on a wall surface of the housing chamber. However, in many cases, a rotating shaft with cutting teeth attached is arranged forward of a dice hole, and therefore, a window will be formed on an upper wall or the like of the housing chamber, which makes it difficult to observe a cut section to be cut by cutting teeth from the window. Additionally, it is not easy to find a change in an amount of clearance between cutting teeth and the dice by observation from the window.

On the other hand, for example, Patent Literature 1 discloses a clearance adjustment method of, after attaching cutting teeth at the time of attaching and setting cutting teeth to a rotating shaft, attaching, in place of a dice, an adjustment plate formed in advance for clearance adjustment separate from the pelletizer apparatus, adjusting the cutting teeth and the adjustment plate to have a predetermined clearance to adjust a clearance between the cutting teeth and the dice, and detaching the adjustment plate after the adjustment.

However, the clearance adjustment method disclosed in Patent Literature 1 is intended to adjust the clearance when a cutting tooth is newly attached and set, not to observe a cut section in operation which is actually cut by a cutting tooth. Therefore, for example, when a clearance changes due to an effect of a temperature change of the pelletizer apparatus or abrasion of a cutting tooth in operation, with the clearance adjustment method disclosed in Patent Literature 1, it is hard to find the change of the clearance and hard to instantly adjust the clearance according to a cut section.

CITATION LIST

Patent Literature

Patent Literature 1: Japanese Laid-open Patent Publication No. 11-129243

SUMMARY OF INVENTION

The present invention has been made in view of the foregoing circumstances, and an object thereof is to provide a pelletizer apparatus capable of visually checking a cut section clearly.

A pelletizer apparatus according to the present invention includes an observation unit for observing, from an outside of a housing chamber, a cut section of a synthetic resin cut by cutting teeth inside the housing chamber, the observation unit including an optical system which sends an optical image of the cut section from the inside of the housing chamber to the outside of the housing chamber. Therefore, such a pelletizer apparatus enables a cut section to be visually checked clearly via the optical system.

The above and other objects, features and advantages of the present invention will become apparent from the following detailed description and accompanying drawings.

DESCRIPTION OF EMBODIMENTS

In the following, one embodiment according to the present invention will be described with reference to the drawings. In each drawing, components denoted by the same reference codes represent the same components to appropriately omit description thereof. In the present specification, those collectively referred to will be denoted by reference codes with subscripts omitted, and those representing individual components will be denoted by reference codes with subscripts added.

Figure 1:
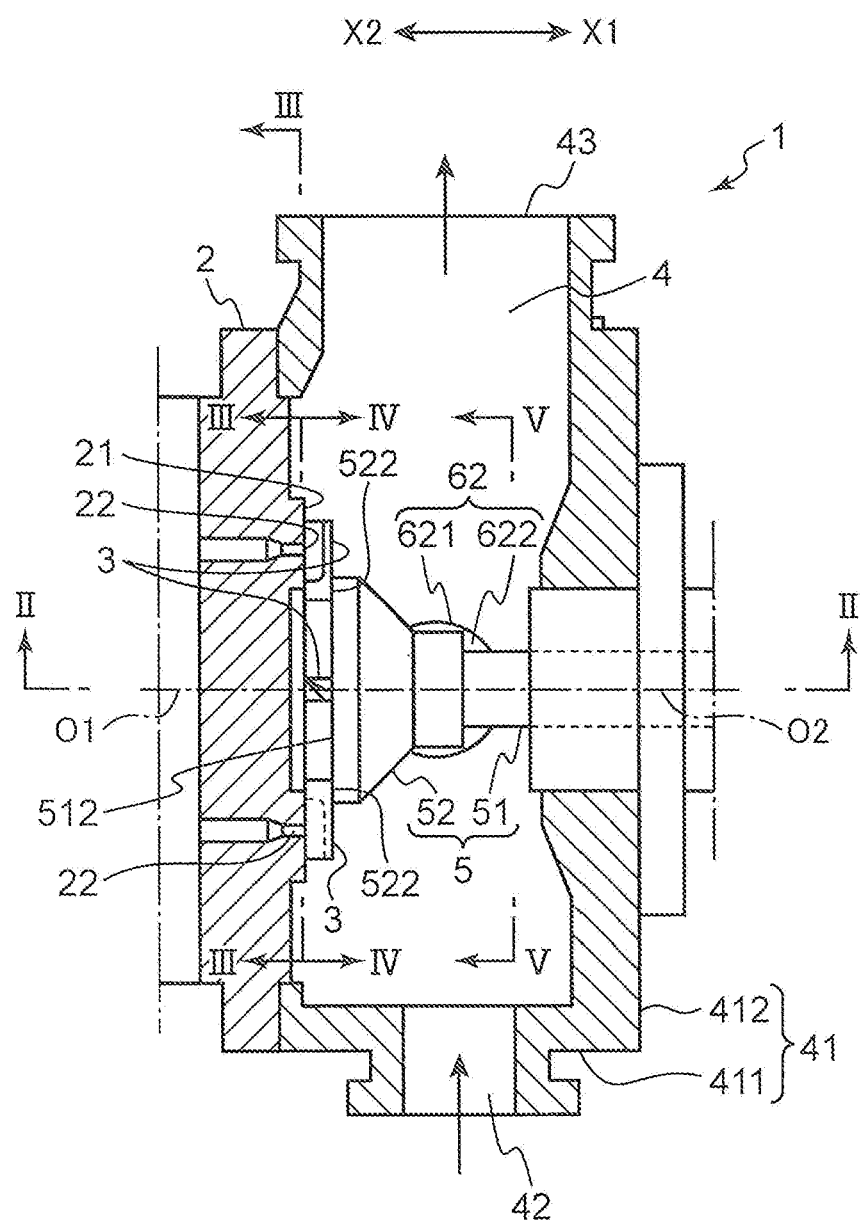
FIG. 1 is a sectional view of a main part of a pelletizer apparatus in a first embodiment.
Figure 2:
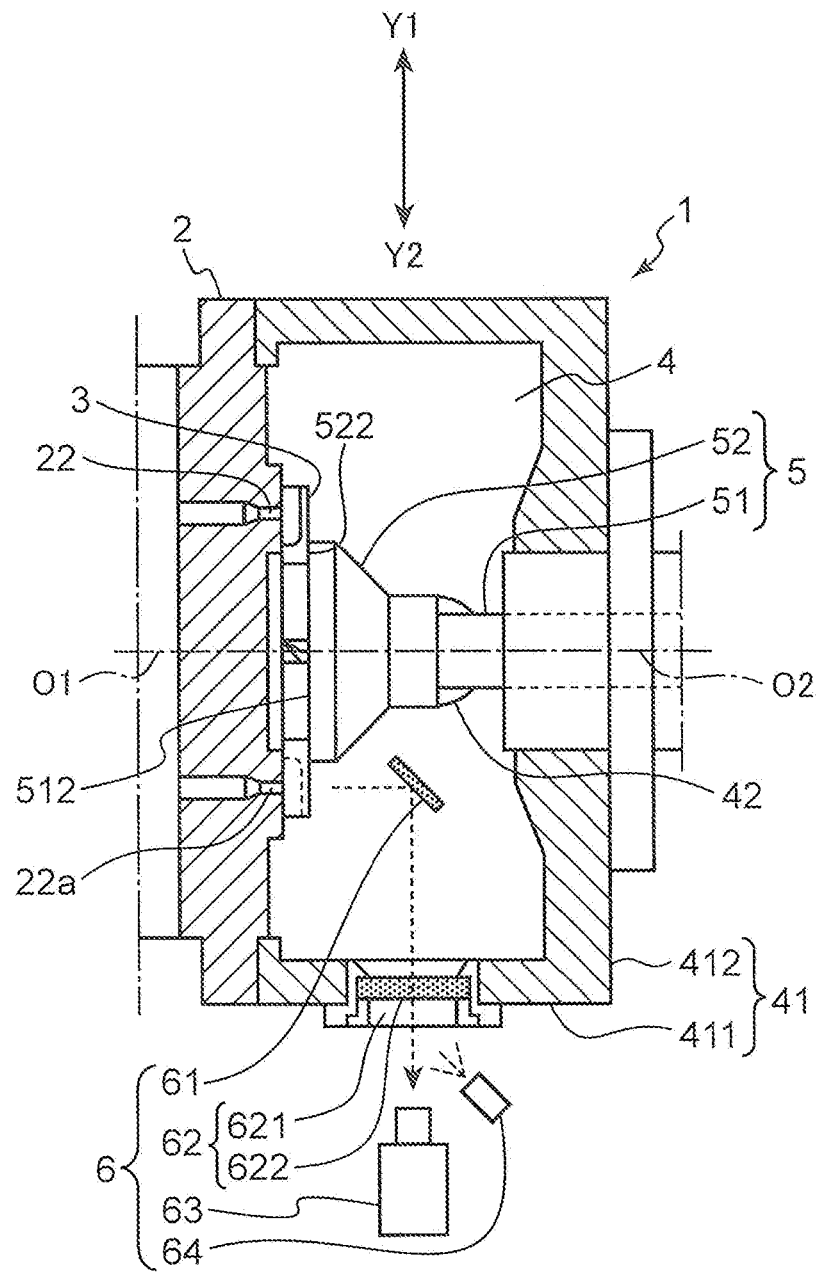
FIG. 2 is a sectional view taken along line II-II in FIG. 1.
Figure 3:
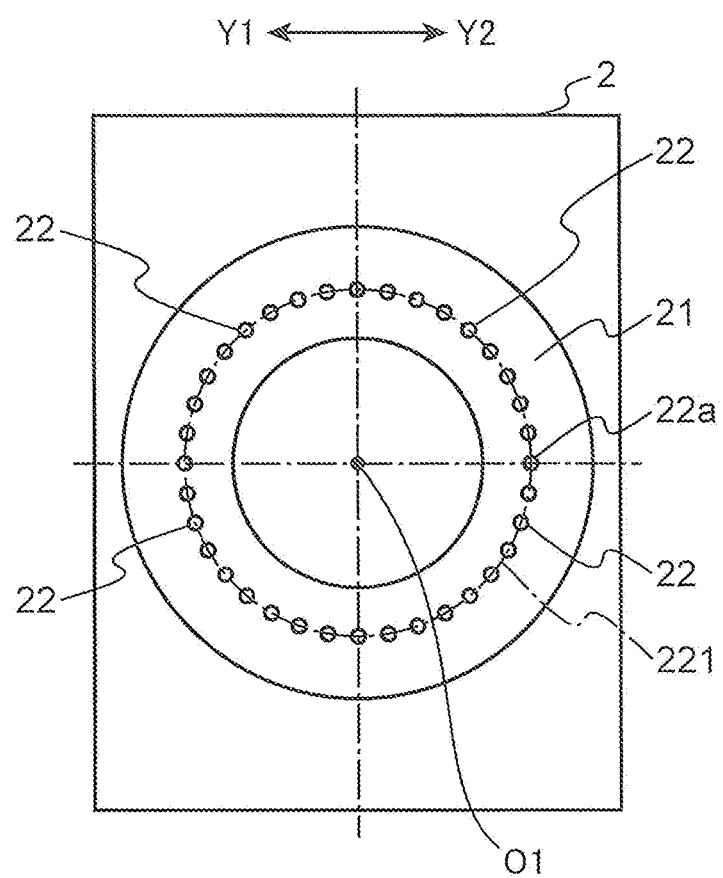
FIG. 3 is a sectional view taken along line III-III in FIG. 1.
Figure 4:
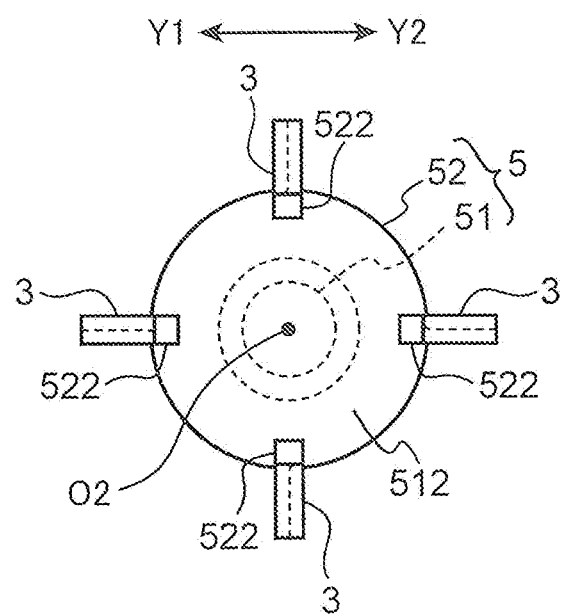
FIG. 4 is a sectional view taken along line IV-IV in FIG. 1.
Figure 5:
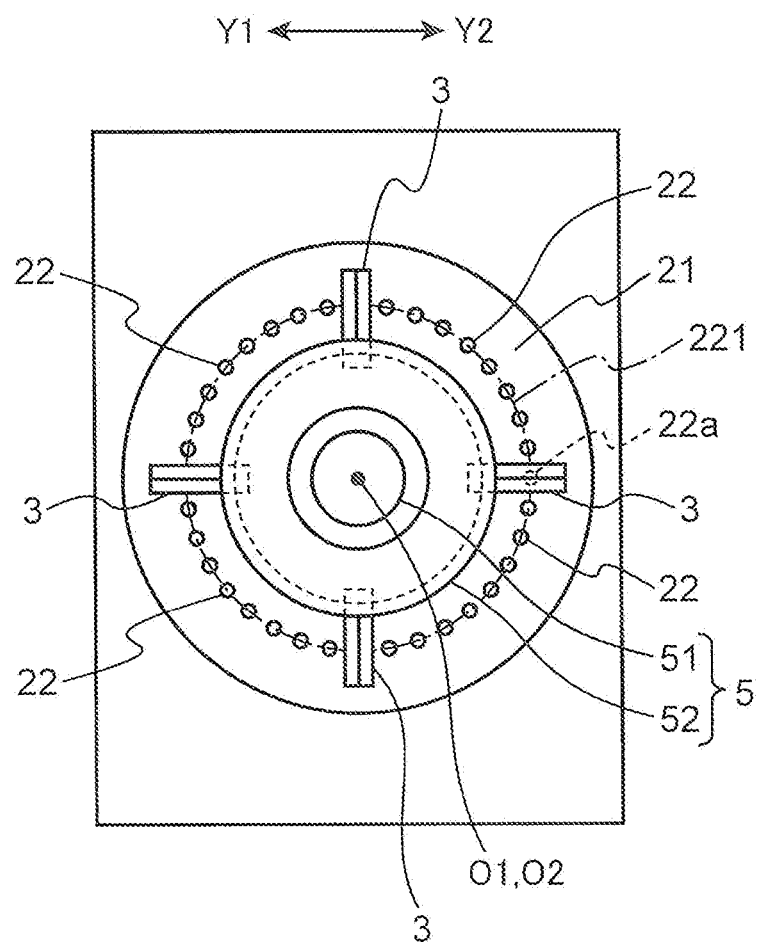
FIG. 5 is a sectional view taken along line V-V in FIG. 1.

FIG. 1 is a sectional view of a main part of a pelletizer apparatus in a first embodiment. FIG. 2 is a sectional view taken along line II-II shown in FIG. 1. FIG. 3 is a sectional view taken along line III-III shown in FIG. 1. FIG. 4 is a sectional view taken along line IV-IV shown in FIG. 1. FIG. 5 is a sectional view taken along line V-V in FIG. 1. In the following, description will be made with an X1 direction as a front side, an X2 direction as a rear side, a Y1 direction as a left side, and a Y2 direction as a right side.

A pelletizer apparatus 1 in the embodiment includes, as shown in FIG. 1 to FIG. 5, a dice 2, cutting teeth 3, a teeth operation unit 5 which operates to rotate the cutting teeth 3, a housing chamber 4 which houses a cut piece (pellet) cut by the cutting teeth 3, and an observation unit 6 for observing, from the outside of the housing chamber 4, a cut section cut by the cutting teeth 3 inside the housing chamber 4.

As shown in FIG. 1, FIG. 3 and FIG. 5, the dice 2 has a dice surface 21 formed on a front surface of the member, and a plurality of dice holes 22a and 22 formed in the dice surface 21. The dice surface 21 is projected frontward from the front surface of the dice 2 so as to be disc-shaped with a predetermined width in a radial direction.

The dice holes 22 are arranged at equal intervals in a circumferential direction on a predetermined pitch circle 221 from a center O1 of the dice surface 21. Each dice hole 22 is formed so as to extend from a back surface of the dice 2 to the dice surface 21 along a thickness direction.

Thus formed dice 2 has the back surface side coupled to a synthetic resin kneader not shown and is configured to extrude a synthetic resin from the dice hole 22.

As shown in FIG. 1 and FIG. 2, the housing chamber 4 is formed to be sectioned by a housing chamber sectioning wall 41 formed to surround a forward part of the dice 2, and the dice 2. Specifically, the housing chamber sectioning wall 41 includes a circumference wall 411, and a front wall 412 formed forward a predetermined distance of the dice 2. The housing chamber 4 is formed to be sectioned by the circumference wall 411 and the front wall 412 of the housing chamber sectioning wall 41, and the dice 2 so as to make the inside of the housing chamber 4 communicate with the dice hole 22.

In a lower part of the circumference wall 411 of the housing chamber sectioning wall 41, an inflow port 42 is provided for causing hot water (water) for cooling a cut piece to flow into the inside of the housing chamber 4. Additionally, in an upper part of the circumference wall 411 of the housing chamber sectioning wall 41, an outflow port 43 is provided for causing hot water flowed into the inside of the housing chamber 4 to flow out.

The teeth operation unit 5 includes a rotating shaft portion 51 and a teeth holding portion 52 which holds the cutting teeth 3. The rotating shaft portion 51 is arranged to pass through the front wall 412 of the housing chamber sectioning wall 41 so as to be freely rotatable such that an axis O2 of the rotating shaft portion 51 and the center O1 of the dice surface 21 are coincident, with one end portion of the rotating shaft portion 51 in an axial direction housed inside the housing chamber 4. The other end portion of the rotating shaft portion 51 is coupled to a drive motor not shown, and the rotating shaft portion 51 rotates along with operation of the drive motor.

The teeth holding portion 52 is coupled to the one end portion of the rotating shaft portion 51 in the axial direction and arranged inside the housing chamber 4 so as to be opposed to the dice 2, and includes, on a circular-shaped dice opposed surface 512 which is opposed to the dice 2, a cutting teeth attachment unit 522 for attaching the cutting teeth 3. This embodiment includes four cutting teeth attachment units 522 formed at four positions at equal interval in a circumferential direction of the dice opposed surface 512.

This embodiment includes four cutting teeth 3 whose number corresponds to the number of the cutting teeth attachment units 522 as shown in FIG. 4 and FIG. 5. The cutting teeth 3 each have a generally rectangular solid shape. The cutting teeth 3 are attached to the cutting teeth attachment units 522 in a freely attachable/detachable manner such that a longitudinal direction of the cutting teeth 3 extends in a radial direction of the dice opposed surface 512 and is arranged on the pitch circle 221 of the dice hole 22.

In this embodiment, the observation unit 6 includes a cut surface visual checking reflecting mirror (one example of an optical system) 61 arranged inside the housing chamber 4, an optical image passing unit 62 which passes an optical image reflected by the cut surface visual checking reflecting mirror 61 to the outside of the housing chamber 4, a camera 63, and a light irradiation unit 64 as shown in FIG. 1 and FIG. 2.

In this embodiment, the optical image passing unit 62 includes a circular-shaped optical image sending hole 621 formed in a right part of the circumference wall 411 of the housing chamber sectioning wall 41, and a plate-shaped transparent body 622 arranged on the optical image sending hole 621. The optical image sending hole 621 is formed to pass from an outer surface to an inner surface of the circumference wall 411. The transparent body 622 covers the optical image sending hole 621 so as to prevent hot water inside the housing chamber 4 from leaking from the optical image sending hole 621.

In this embodiment, the cut surface visual checking reflecting mirror 61 is supported by a supporting member not shown so as to be arranged forward of the rightmost-side dice hole 22a and at the left side of the optical image passing unit 62.

More specifically, the housing chamber sectioning wall 41 of the housing chamber 4 is provided with a supporting member. One end of the supporting member is coupled to the housing chamber sectioning wall 41 and the other end of the supporting member is extended to be forward of the rightmost-side dice hole 22 and to a position at the left side of the optical image passing unit 62. Then, the cut surface visual checking reflecting mirror 61 is coupled to the other end of the supporting member, which enables reflecting and sending, to the optical image passing unit 62, of an optical image of a cut section of a synthetic resin extruded from the dice hole 22, which synthetic resin is cut by the cutting teeth 3 having crossed the rightmost-side dice hole 22a of the dice 2 and the dice holes 22 in the vicinity of the dice hole 22a.

In this embodiment, the camera 63 is formed of a high-speed camera capable of photographing 100 frames per second, for example. The camera 63 is arranged at the right side of the optical image passing unit 62 outside the housing chamber 4 so as to be able to take in and photograph an optical image sent by the cut surface visual checking reflecting mirror 61 via the optical image passing unit 62.

The light irradiation unit 64 is arranged on the side of the camera 63 outside the housing chamber 4 so as to be able to irradiate the rightmost-side dice hole 22a of the dice 2 and a periphery thereof inside the housing chamber 4 with a light beam via the optical image passing unit 62.

Next, operation of the pelletizer apparatus 1 of the first embodiment will be described. The housing chamber 4 is brought into a state where while hot water is flowing in from the inflow port 42, the housing chamber 4 is filled up with hot water, which hot water is flowing out from the outflow port 43.

In this state, upon starting the drive motor, the rotating shaft portion 51 of the teeth operation unit 5 rotates, following which rotation, the cutting teeth 3 rotate along the dice surface 21. Additionally, from each dice hole 22 of the dice 2, a synthetic resin is extruded to the inside of the housing chamber 4.

The extruded synthetic resin is cut every time the cutting teeth 3 cross the dice hole 22 to form a cut piece (pellet).

Then, at the time of cutting, immediately after the cutting teeth 3 cross the rightmost-side dice hole 22a or the dice hole 22 in the vicinity thereof, the camera 63 photographs a cut surface of a cut piece, or a cut surface of a synthetic resin in the dice hole 22 (in this embodiment, the camera 63 photographs a cut surface of a cut piece immediately after the cutting teeth 3 have crossed the rightmost-side dice hole 22a). This enables a cut surface of a synthetic resin to be visually checked via the camera 63 constantly, thereby determining whether a clearance between the cutting teeth 3 and the dice surface 21 is good or not by viewing, for example, a shape of a cut surface of a synthetic resin, or the like. Accordingly, in a case, for example, where a cut surface of a synthetic resin has an oval shape or has a burr attached, determination is made that a clearance between the cutting teeth 3 and the dice surface 21 is not good, so that modification is instantly allowed.

Figure 6:
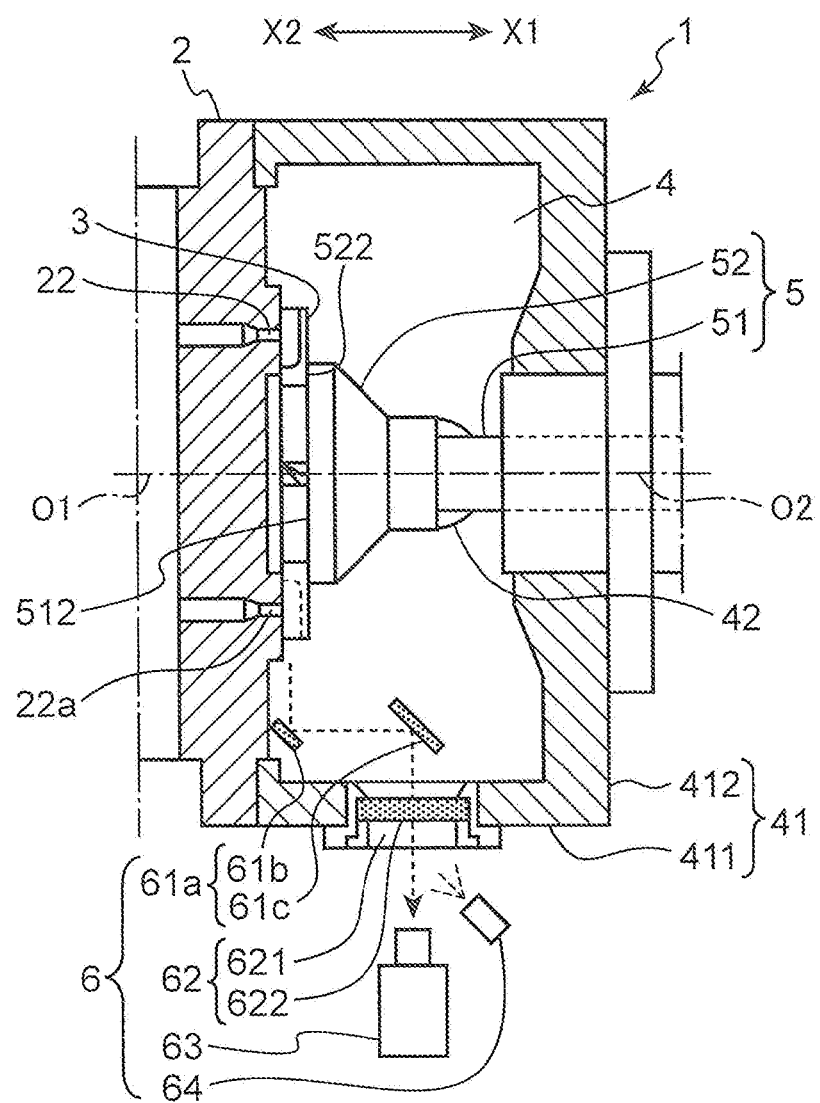
FIG. 6 is a sectional view for illustrating a first modification of an observation unit in the first embodiment.

Although an optical system of the observation unit is assumed to be the cut surface visual checking reflecting mirror 61 arranged forward of the rightmost-side dice hole 22a and at the left side of the optical image passing unit 62 in the above first embodiment, the system is not limited thereto, but can be appropriately modified. FIG. 6 is a sectional view for illustrating a first modification of the observation unit in the first embodiment. For example, the optical system in the observation unit of the first modification may be a clearance visual checking reflecting mirror 61a including a clearance visual checking first reflecting mirror 61b arranged at an outer side of the dice hole 22a in a radial direction of the dice surface 21, and a clearance visual checking second reflecting mirror 61c arranged forward of the clearance visual checking first reflecting mirror 61b and at the left side of the optical image passing unit 62 as shown in FIG. 6.

In such a configuration, the clearance visual checking first reflecting mirror 61b and the clearance visual checking second reflecting mirror 61c enable a cut section to be viewed from the outer side in the radial direction of the dice surface 21, as well as enabling a clearance between the dice surface 21 and the cutting teeth 3 to be visually checked.

Additionally, although the clearance visual checking reflecting mirror 61a may be arranged in place of the above cut surface visual checking reflecting mirror 61, the clearance visual checking reflecting mirror 61a, in addition to the above cut surface visual checking reflecting mirror 61, may be arranged together with the above cut surface visual checking reflecting mirror 61.

Figure 7A:
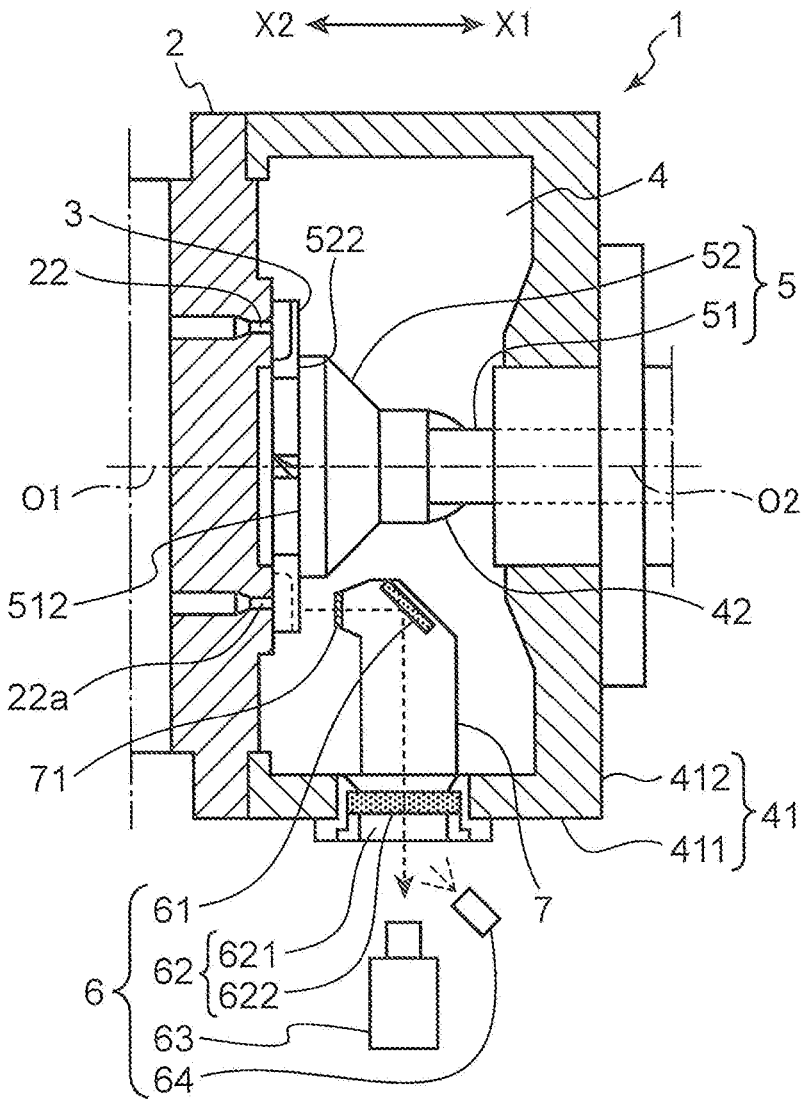
FIG. 7 is a view for illustrating a second modification of the observation unit in the first embodiment.
Figure 7B:
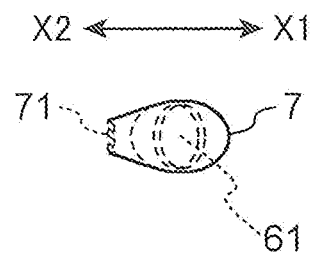

Additionally, the cut surface visual checking reflecting mirror 61 may be covered with an optical system covering member 7. FIG. 7 is a view for illustrating a second modification of the observation unit in the first embodiment. FIG. 7A is a sectional view thereof, and FIG. 7B is a front view thereof. For example, as shown in FIG. 7, the optical system covering member 7 is formed of, for example, a net member having holes each with a size that allows no cut piece to pass, and covers generally the whole of the cut surface visual checking reflecting mirror 61. The optical system covering member 7 of this embodiment has a transparent body 71 arranged at a position forward of the cut surface visual checking reflecting mirror 61 so as to prevent a part of the optical system covering member 7 from blocking the cut surface visual checking reflecting mirror 61.

In such a configuration, covering the cut surface visual checking reflecting mirror 61 with the optical system covering member 7 reduces a force of a water flow splashing on the optical system covering member 7, thereby making the cut surface visual checking reflecting mirror 61 be less liable to be displaced due to the force of the water flow. Forming the optical system covering member 7 with a net results in reducing a force of a water flow splashing on the optical system covering member 7.

In this embodiment, the optical system covering member 7 is formed to surround an optical path so as to prevent a cut piece subjected to cutting from entering the optical path, the optical path being formed from the dice hole 22a to the cut surface visual checking reflecting mirror 61, and from the cut surface visual checking reflecting mirror 61 to the circumference wall 411 (the inner side wall) of the housing chamber 4. Without having a cut piece which has been already cut being reflected on the cut surface visual checking reflecting mirror 61, this configuration enables the cut section to be reliably viewed.

Figure 8:
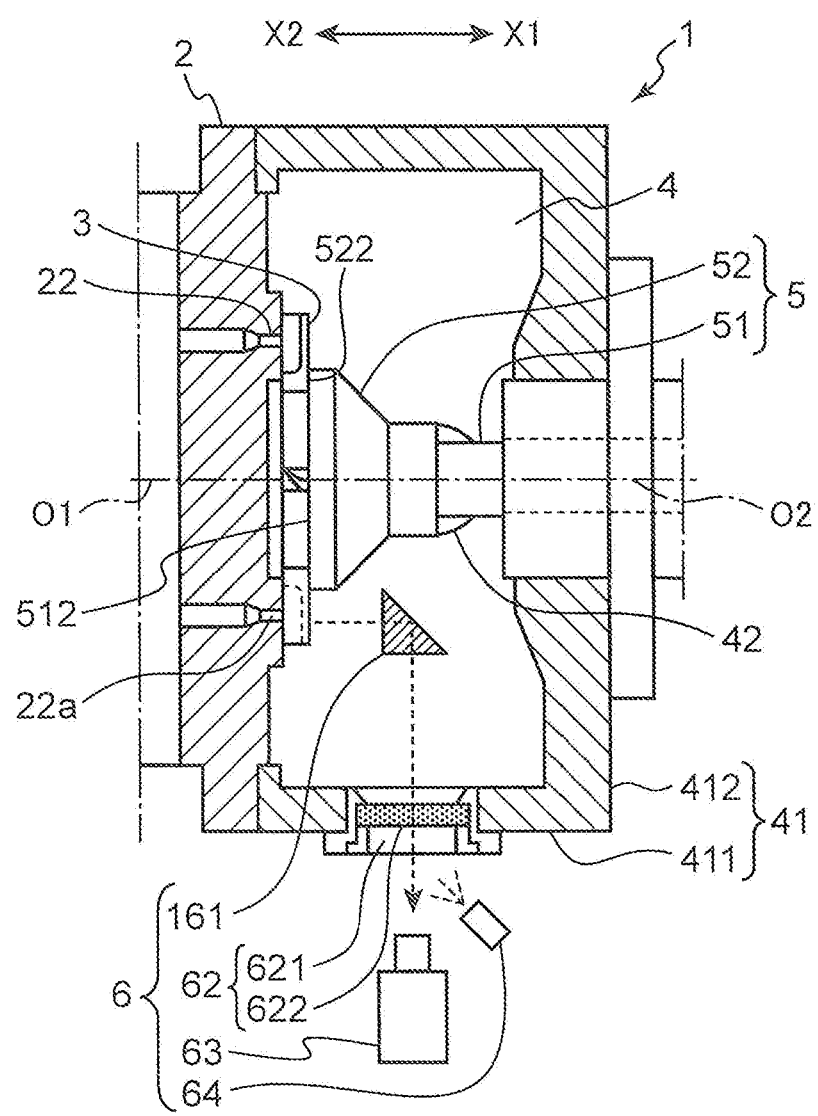
FIG. 8 is a view for illustrating a third modification of the observation unit in the first embodiment.
Figure 9:
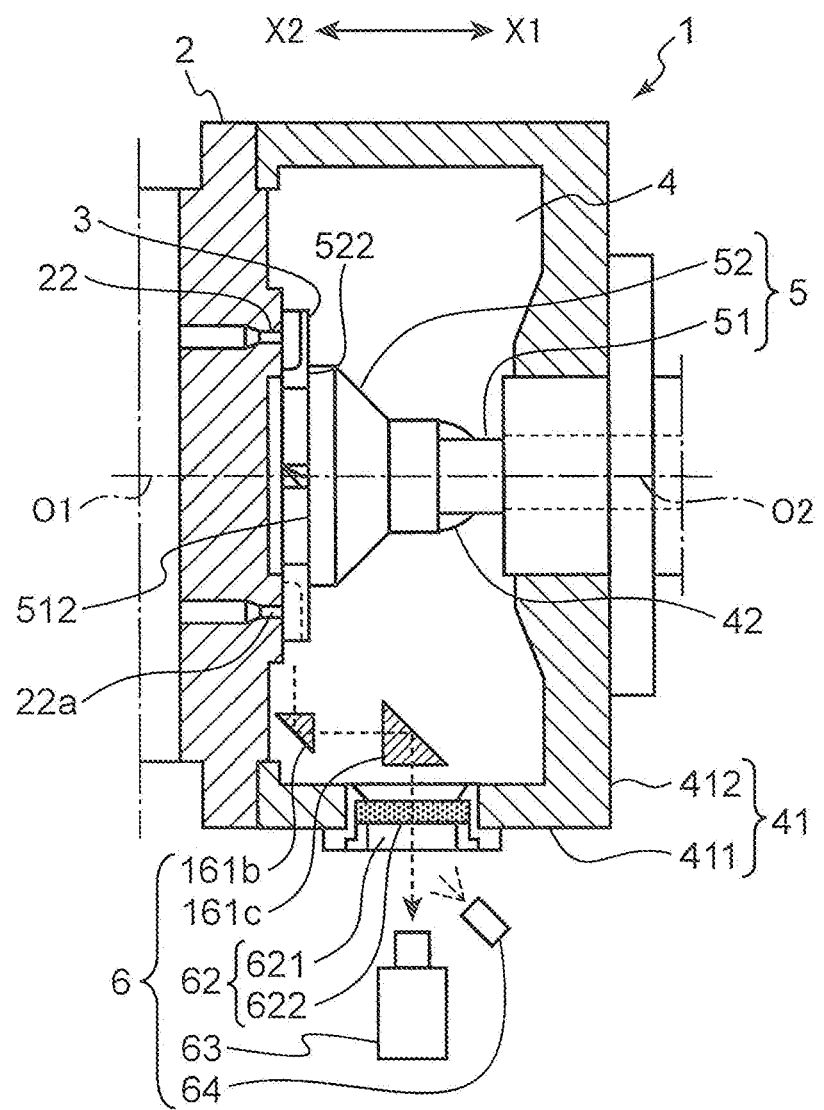
FIG. 9 is a view for illustrating a fourth modification of the observation unit in the first embodiment.
Figure 10A:
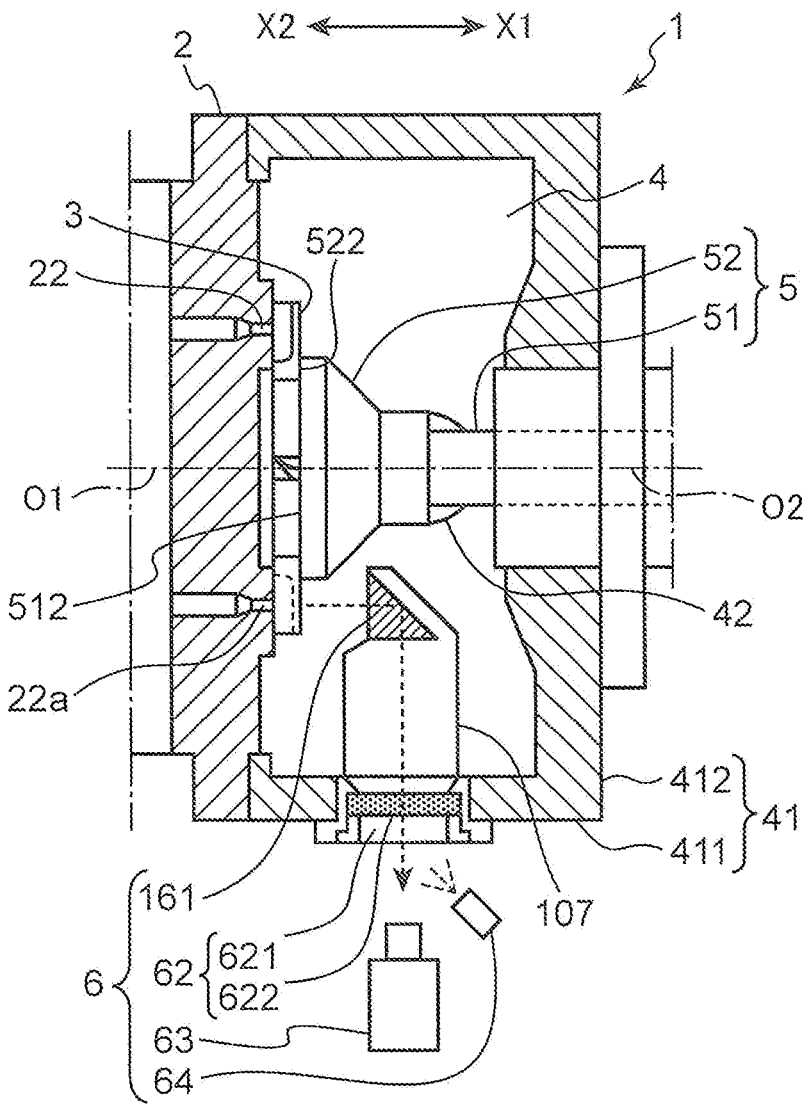
FIG. 10 is a view for illustrating a fifth modification of the observation unit in the first embodiment.
Figure 10B:
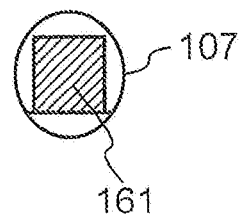

Additionally, although in the above first embodiment, the optical system of the observation unit is configured with the cut surface visual checking reflecting mirrors 61 and 61a, the optical system in the observation unit is not limited to the mode including the reflecting mirrors 61 and 61a, but may be configured with, for example, a prism which refracts a light beam, or the like. FIG. 8 is a view for illustrating a third modification of the observation unit in the first embodiment. FIG. 9 is a view for illustrating a fourth modification of the observation unit in the first embodiment. FIG. 10 is a view for illustrating a fifth modification of the observation unit in the first embodiment. FIG. 10A is a sectional view thereof, and FIG. 10B is a front view thereof.

For example, in place of the cut surface visual checking reflecting mirror 61 shown in FIG. 2, a cut surface visual checking prism 161 may be arranged generally at the same position as that of the cut surface visual checking reflecting mirror 61 as shown in FIG. 8, so that an optical image of a cut section may be sent to the optical image passing unit 62 by the cut surface visual checking prism 161, the cut section being a synthetic resin extruded from the dice hole 22 and cut as a result of crossing of the cutting teeth 3 over the rightmost-side dice hole 22a of the dice 2.

Additionally, for example, in place of the clearance visual checking first reflecting mirror 61b of the clearance visual checking reflecting mirror 61a shown in FIG. 6, a clearance visual checking first prism 161b may be arranged generally at the same position as that of the clearance visual checking first reflecting mirror 61b as shown in FIG. 9, while in place of the clearance visual checking second reflecting mirror 61c of the clearance visual checking reflecting mirror 61a shown in FIG. 6, a clearance visual checking second prism 161c may be arranged generally at the same position as that of the clearance visual checking second reflecting mirror 61c as shown in FIG. 9. This results in sending an optical image of a cut section to the optical image passing unit 62 by the clearance visual checking first prism 161b and the clearance visual checking second prism 161c.

When the optical system is thus configured with a prism, the prism may be covered with a similar optical system covering member 107 to the optical system covering member 7 which covers the reflecting mirror 61 as shown in FIG. 10.

Additionally, in a case where the optical system is configured with a prism, for example, one end portion of the prism may be passed through a through-hole provided in the circumference wall 411 of the housing chamber sectioning wall 41, so that a light beam reflected by the prism comes out from the inside of the housing chamber 4 to the outside. This enables omission of the supporting members which support the transparent body 622 and the reflecting mirror to facilitate production.

The prism, however, should be used carefully. A prism, which uses all the reflections for the refection to bend an optical path in the prism, is premised on use in air and on refractive indexes of a prism material and a surrounding medium are large (e.g. an optical glass:air is 1.52:1.00) and therefore, in water, the prism cannot be used similarly to use in air because a difference in a refractive index between the prism material and the surrounding medium is small (optical glass:water is 1.52:1.33), and a range of angle at which the entire reflection occurs is narrowed. A prism desirably has a reflecting surface coated with a reflecting layer such as aluminum.

Figure 11:
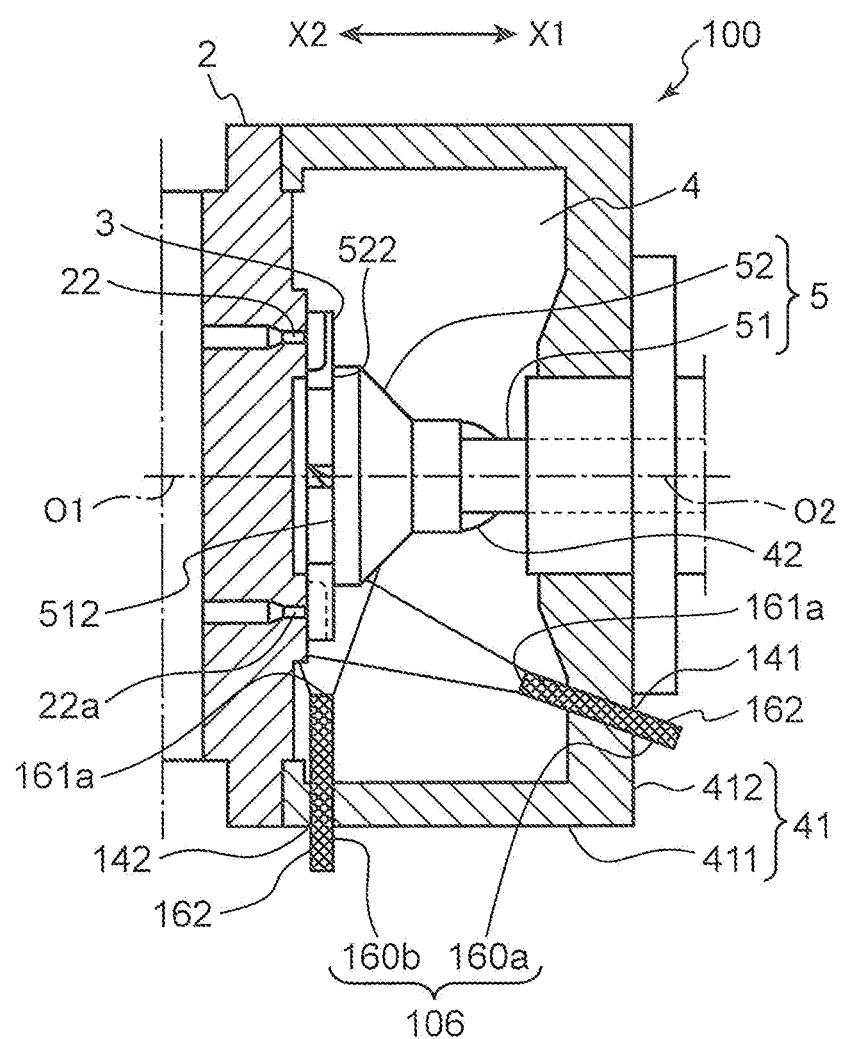
FIG. 11 is a sectional view of a main part of a pelletizer apparatus in a second embodiment.
Figure 12:
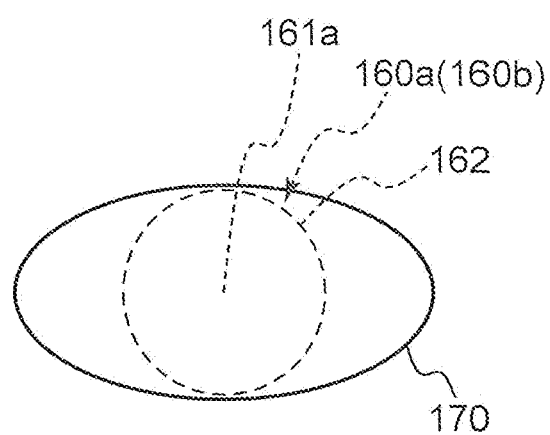
FIG. 12 is a sectional view of a modification of an observation unit in the pelletizer apparatus in the second embodiment.

Next, a pelletizer apparatus 100 of a second embodiment will be described. FIG. 11 is a sectional view of a main part of the pelletizer apparatus in the second embodiment. FIG. 12 is a sectional view of a modification of an observation unit in the pelletizer apparatus in the second embodiment.

The pelletizer apparatus 100 in the second embodiment includes, similarly to the pelletizer apparatus 1 in the above first embodiment, a dice 2, cutting teeth 3, a teeth operation unit 5, a housing chamber 4, and an observation unit 106 as shown in FIG. 11. The dice 2, the cutting teeth 3, the teeth operation unit 5, and the housing chamber 4 adopt the same configurations as those of the above first embodiment.

The observation unit 106 in the second embodiment uses endoscopes 160a and 160b as an optical system. The endoscope in this embodiment is formed with two endoscopes, the first endoscope 160a, and the second endoscope 160b adopting the same configuration as that of the first endoscope 160a.

The first endoscope 160a includes a tubular casing 162, and a lens not shown which is disposed inside the casing 162.

The casing 162 includes a photographing opening 161a provided at one end thereof. Then, the casing 162 is held in a housing chamber sectioning wall 41 by insertion into a first endoscope insertion hole 141.

More specifically, in the housing chamber sectioning wall 41, the first endoscope insertion hole 141 is formed so as to extend from the inside of the housing chamber 4 to the outside thereof. The photographing opening 161a of the casing 162 is arranged inside the housing chamber 4, and the other end portion of the casing 162 is arranged outside the housing chamber 4. Additionally, the photographing opening 161a is arranged forward of the dice hole 22 so as to face the dice hole 22 in this state.

The lens allows passing, through the photographing opening 161a, of an optical image of a cut section of a synthetic resin extruded from the dice hole 22 and cut when the cutting teeth cross the dice hole 22a. In this embodiment, the optical image having passed through the lens is sent to the outside of the housing chamber 4 by an optical fiber provided on an inner circumference of the casing 162, and outside the casing 162, the optical image of the cut section is displayed on a display screen connected to the optical fiber.

A second endoscope 160b is held in a circumference wall 411 by insertion into a second endoscope insertion hole 142 formed in the circumference wall 411 so as to pass from the inside to the outside of the housing chamber 4. As a result, the photographing opening 161a of the casing 162 of the second endoscope 160b is arranged inside the housing chamber 4, and the other end portion of the casing 162 of the second endoscope 160b is arranged outside the housing chamber 4. In this state, the photographing opening 161a is arranged at the outer side in the radial direction of the dice hole 22 so as to face the dice hole 22.

Use of such first endoscope 160a and second endoscope 160b enables the endoscopes 160a and 160b to be arranged inside the housing chamber 4 from the insertion holes 141 and 142 opened, for example, in the walls 411 and 412 of the housing chamber 4, thereby facilitating arrangement of an optical system inside the housing chamber 4. With a display device connected to the endoscopes 160a and 160b, a cut section can be viewed on the display device to enable more reliable visual check of the cut section.

Although the second embodiment is assumed to include two endoscopes, the first endoscope 160a and the second endoscope 160b, the second embodiment may include, for example, either one of the first endoscope 160a and the second endoscope 160b, or a total of three or more including the first endoscope 160a and the second endoscope 160b, and an additional one or more, and can be appropriately changed.

Additionally, although in the second embodiment, the first endoscope 160a and the second endoscope 160b have an optical image sent to the outside of the housing chamber 4 by an optical fiber, either one or both of the first endoscope 160a and the second endoscope 160b may have a CCD (Charge-Coupled Device) image sensor which, for example, converts an optical image to an electric signal and sends the electric signal to the outside of the housing chamber 4, and can be appropriately changed.

Additionally, when the first endoscope 160a or the second endoscope 160b is used, as shown in FIG. 12, the endoscope may be covered by an optical system covering member 170 similar to the optical system covering member 7 shown in the above first embodiment.

Additionally, in a case where the first endoscope 160a or the second endoscope 160b is used, when the endoscope is provided with a light irradiation unit disposed in a casing, it is unnecessary to additionally dispose a light irradiation unit, which facilitates production.

The present specification discloses various aspects of the technique as described above, the main part of the technique is summarized as follows.

The pelletizer apparatus according to one aspect includes a housing chamber which houses a synthetic resin extruded from a dice hole; cutting teeth which are arranged inside the housing chamber to sequentially cut the synthetic resin inside the housing chamber; and an observation unit for observing, from the outside of the housing chamber, a cut section of the synthetic resin cut by the cutting teeth, the observation unit including an optical system which sends an optical image of the cut section from the inside of the housing chamber to the outside of the housing chamber.

According to this configuration, since the observation unit includes the optical system arranged inside the housing chamber so as to be able to send an optical image of a cut section of a resin cut by the cutting teeth from the inside of the housing chamber to the outside of the housing chamber, visual check of a cut section can be constantly conducted with clearness via the optical system. This also allows viewing of a section of a cut piece having been cut, so that viewing of the section enables determination whether the cut section is good or not, i.e. whether a clearance is good or not with ease. Accordingly, a clearance can be instantly adjusted according to a cut section.

In the above pelletizer apparatus according to another aspect, the housing chamber includes an inflow port which causes water to flow into the inside of the housing chamber, and an outflow port which causes the flowed in water to flow out to the outside of the housing chamber, in which the observation unit includes an optical system covering unit which covers the optical system so as to be able to reduce a force applied to the optical system by a water flow flowing inside the housing chamber.

According to this configuration, the optical system covering unit reduces a force of a water flow splashing on the optical system, thereby making the optical system be less liable to be displaced during operation of the device due to a water flow.

In the above pelletizer apparatus according to a further aspect, in order to prevent a cut piece which has been formed by cutting of the synthetic resin from entering an optical path, the optical system covering unit is formed to surround the optical path, the optical path being formed from the dice hole to the optical system, and from the optical system to an inner side wall of the housing chamber.

According to this configuration, the optical system covering unit prevents a cut piece from entering an optical path to block the optical path, so that a cut section can be visually checked with clearness via the optical system.

In the above pelletizer apparatuses according to a still further aspect, the optical system is an endoscope.

According to this configuration, use of an endoscope enables arrangement of the endoscope inside the housing chamber from a through-hole opened, for example, in a wall surface of the housing chamber, thereby facilitating arrangement of the optical system inside the housing chamber. With a display device connected to the endoscope, a cut section can be viewed on the display device to enable more reliable visual check of the cut section.

In the above pelletizer apparatuses according to a still further aspect, the observation unit includes a camera which photographs an optical image sent from the optical system, the camera being arranged outside the housing chamber so as to be able to photograph the optical image from the outside of the housing chamber.

According to this configuration, a cut section is photographed by a camera to enable a cut section to be visually checked more reliably.

The above pelletizer apparatuses according to a still further aspect further include a light irradiation unit which irradiates the cut section with a light beam.

According to this configuration, a cut section can be visually checked with more ease due to the light irradiation unit.

The present application claims priority from Japanese Patent Application No. 2014-257096 filed on Dec. 19, 2014, disclosure of which is all incorporated herein.

Although for representing the present invention, the present invention has been appropriately and fully described in the foregoing with respect to the embodiments with reference to the drawings, it should be recognized that the above embodiments can be modified and/or improved by those skilled in the art with ease. Accordingly, unless a modified mode or an improved mode that those skilled in the art implement departs from a range of claims, it is construed that the modified mode or the improved mode is included in the scope of claims.

INDUSTRIAL APPLICABILITY

The present invention can provide a pelletizer apparatus.

The invention claimed is:

1. A pelletizer apparatus comprising:
a housing chamber which houses a synthetic resin extruded from a dice hole;
cutting teeth which are arranged in an inside of the housing chamber to sequentially cut the synthetic resin inside the housing chamber; and
an observation unit for observing, from an outside of the housing chamber, a cut section of the synthetic resin cut by the cutting teeth,
wherein the housing chamber includes an inflow port which causes water to flow into the inside of the housing chamber, and an outflow port which causes the water flowed into the inside of the housing chamber to flow out to the outside of the housing chamber,
wherein the observation unit includes an optical system which sends an optical image of the cut section from the inside of the housing chamber to the outside of the housing chamber,
wherein the observation unit includes an optical system covering unit which covers the optical system so as to be able to reduce a force applied to the optical system by a water flow flowing inside the housing chamber, and
wherein the optical system covering unit is formed of a net member which surrounds an optical path and has holes each with a size allowing no cut piece to pass, the optical path being formed from the dice hole to the optical system, and from the optical system to an inner side wall of the housing chamber, the cut piece having been formed by cutting the extruded synthetic resin.

2. The pelletizer apparatus according to claim 1, wherein the optical system is an endoscope.

3. The pelletizer apparatus according to claim 1, wherein the observation unit includes a camera which photographs the optical image sent from the optical system, the camera being arranged outside the housing chamber so as to be able to photograph the optical image from the outside of the housing chamber.

* * * * *